United States Patent
Marten et al.

(10) Patent No.: US 11,818,426 B2
(45) Date of Patent: Nov. 14, 2023

(54) METHOD AND SYSTEM FOR ADAPTIVE AUDIO MODIFICATION

(71) Applicant: DISH Network L.L.C., Englewood, CO (US)

(72) Inventors: Neil Marten, Lakewood, CO (US); Rebecca Albinola, Lakewood, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 16/684,408

(22) Filed: Nov. 14, 2019

(65) Prior Publication Data

US 2021/0152880 A1    May 20, 2021

(51) Int. Cl.

| | |
|---|---|
| H04N 21/439 | (2011.01) |
| H04N 21/44 | (2011.01) |
| H04N 21/431 | (2011.01) |
| H04N 21/454 | (2011.01) |
| H04N 21/466 | (2011.01) |
| H04N 21/81 | (2011.01) |
| G06N 20/00 | (2019.01) |
| H04N 21/472 | (2011.01) |

(52) U.S. Cl.
CPC ..... H04N 21/4398 (2013.01); H04N 21/4394 (2013.01); H04N 21/44 (2013.01); H04N 21/47217 (2013.01)

(58) Field of Classification Search
CPC .......... H04N 21/4394; H04N 21/4542; H04N 21/4318; H04N 21/4398; H04N 21/44; H04N 21/4666; H04N 21/47217; H04N 21/9106; G06N 20/00; G06N 3/084

USPC ........................................................ 725/139
See application file for complete search history.

(56) References Cited

U.S. PATENT DOCUMENTS

| | | | | |
|---|---|---|---|---|
| 6,795,808 | B1* | 9/2004 | Strubbe | G10L 15/1822 704/275 |
| 9,531,998 | B1* | 12/2016 | Farrell | H04N 7/147 |
| 2001/0007151 | A1* | 7/2001 | Vorenkamp | H01L 27/0248 725/151 |
| 2004/0172240 | A1* | 9/2004 | Crockett | H04N 5/60 348/E5.122 |
| 2014/0068661 | A1* | 3/2014 | Gates, III | H04N 21/441 725/34 |
| 2014/0149117 | A1* | 5/2014 | Bakish | G10L 15/187 704/248 |
| 2014/0259039 | A1* | 9/2014 | Nielsen | H04H 60/58 725/14 |

(Continued)

*Primary Examiner* — Hsiungfei Peng
(74) *Attorney, Agent, or Firm* — Seed IP Law Group LLP

(57) ABSTRACT

Systems and methods for modifying audio events in video content that correspond to one or more defined audio event types. A request is received to modify audio events in video corresponding to an audio event type. Video content to be presented on a display device is obtained that includes visual and audio content. An occurrence of a defined audio event corresponding to a defined audio event type is identified in the audio content. The defined audio event is modified according to a modification operation to generate modified audio content. The modified audio content is associated with a segment of the visual content that corresponds to the occurrence of the defined audio event. The modified audio content is provided in association with the segment of visual content for display on the display device.

21 Claims, 9 Drawing Sheets

(56) References Cited

U.S. PATENT DOCUMENTS

| | | | |
|---|---|---|---|
| 2014/0379343 A1* | 12/2014 | Karimi-Cherkandi | ............... H04M 1/2475 704/246 |
| 2016/0100208 A1* | 4/2016 | Howcroft | ........... H04N 21/2358 725/18 |
| 2017/0324990 A1* | 11/2017 | Eban | ................... G10L 21/0208 |
| 2018/0226064 A1* | 8/2018 | Seagriff | ........... G10K 11/17881 |
| 2019/0197369 A1* | 6/2019 | Law | .................... G06K 9/0063 |
| 2019/0327524 A1* | 10/2019 | Milavsky | ............... H04H 60/29 |
| 2020/0073902 A1* | 3/2020 | Milazzo | .............. G06F 16/3328 |
| 2020/0136580 A1* | 4/2020 | Renner | ............. H04N 21/4852 |
| 2020/0310528 A1* | 10/2020 | Upmanue | ............ H04N 5/2253 |

* cited by examiner

METHOD AND SYSTEM FOR ADAPTIVE AUDIO MODIFICATION

BACKGROUND

Technical Field

The present disclosure relates media content playback in multimedia systems and, more particularly, to filtering audio content for playback in multimedia systems.

Description of the Related Art

The variety, volume, and availability of video media content available for viewer consumption have increased dramatically in recent years. However, some viewers and other entities nearby, such as pets or children, may be sensitive to certain audio content presented in connection with video content. During playback of video content on a viewer's television or mobile device, certain audio events may disturb viewers or others nearby. For example, the sound of a door bell or a dog barking when a viewer is watching a television show may disturb the viewer's dog and cause the dog to become agitated and bark. As another example, the sound of an infant crying in video may alarm some viewers with infants and cause the viewers to check on their infant. Even the sound of gunshots or sirens may be disturbing to sensitive viewers. Many times, viewers cannot predict the occurrence of such audio events and at least some multimedia systems do not warn viewers that potentially disruptive or disturbing audio events are present in video content. Moreover, different viewers have different sensitivities that induce unique responses to particular audio events. As a result, it is a difficult challenge for content providers to detect potentially disruptive audio events in video content and to identify which viewers might be sensitive to certain audio events.

BRIEF SUMMARY

Briefly stated, the technologies disclosed herein include systems, devices, and operating methods thereof, for modifying audio content of video content to be displayed on a display device. A request may be received to modify defined audio events in video content that correspond to one or more defined audio event types. The defined audio event types to be modified have characteristics that could disrupt, agitate, distract or otherwise disturb viewers or others nearby. Video content that includes visual and audio content may be obtained from memory and processed to identify occurrences, if any, of the defined audio event types in audio content of the video content. Occurrences of defined audio events of a defined audio event type may be identified in video content based on user input received from another user indicating the occurrences or based on output of a machine learning model that is trained to identify occurrences of the defined audio event type.

As a result of identifying occurrences of the defined audio event types in the audio content of the video content, the defined audio events in the video content may be modified to eliminate, decrease, or attenuate the conspicuity of the defined audio event type when the corresponding visual content of the video is presented. In some embodiments, modification of the defined audio events may include performing active noise cancellation procedures in which an audio event is generated having opposing amplitudes to the defined audio event occurrence identified. In some embodiments, modification of the defined audio events may include performing a frequency domain transform of the defined audio event occurrence and filtering frequency content in the transformed audio event occurrence by applying one or more frequency filters. Modification of the defined audio events may include obtaining different audio content than the defined audio event occurrence, such as by obtaining audio content to be substituted for the defined audio events.

The modified audio content may be associated with the corresponding visual content in the video content that corresponds to the defined audio event. The modified audio content may be mixed with or replace the defined audio event to mitigate or eliminate disturbance of the viewer or others nearby.

DETAILED DESCRIPTION

Figure 1:
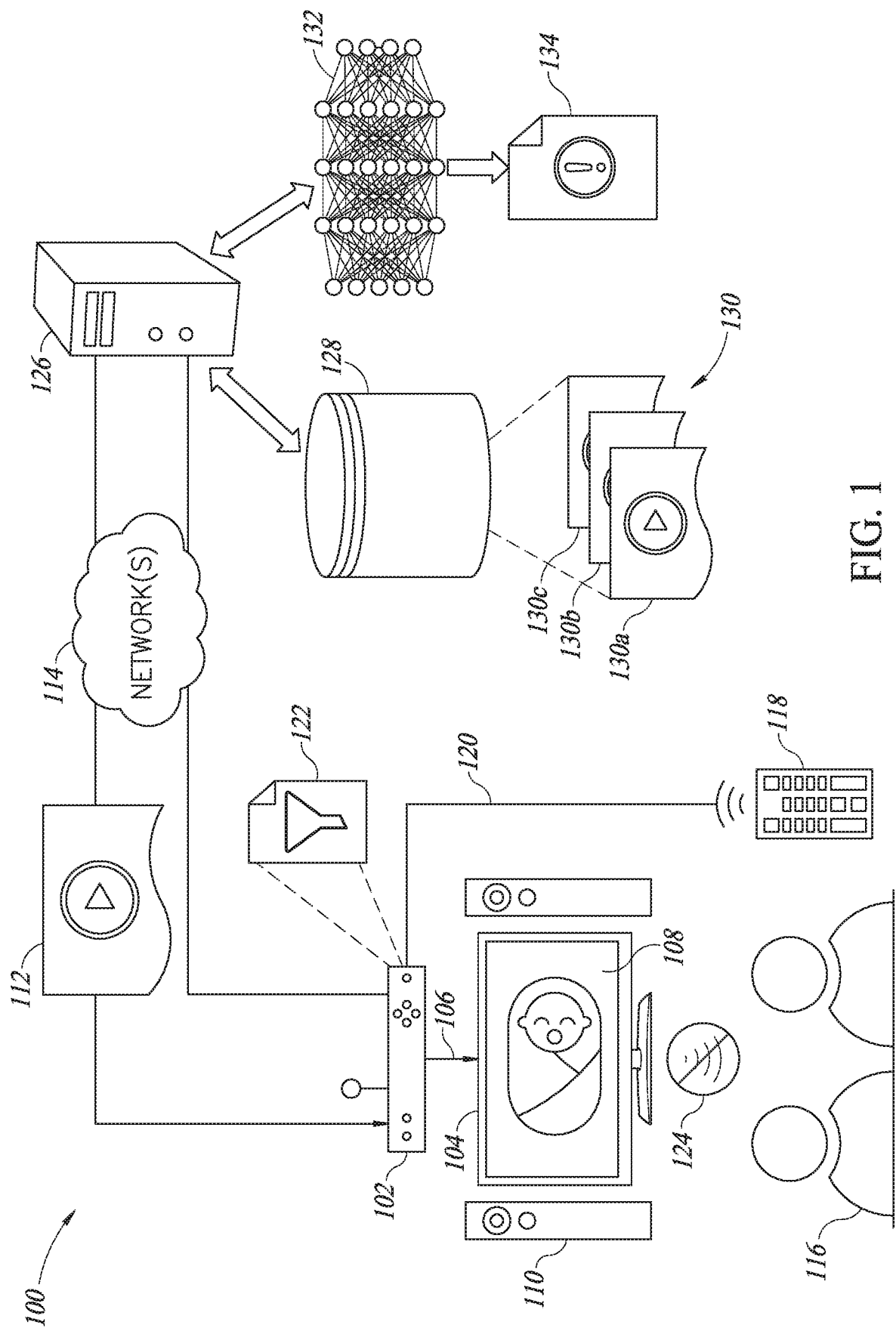
FIG. 1 is a diagram illustrating an example environment in which audio content associated with video content is modified, according to one or more embodiments.

FIG. 1 shows an environment in which a system 100 is configured to modify audio content associated with video content according to one or more embodiments. The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

The present disclosure is equally applicable to systems for presenting video media content, which may include cable television systems, broadcast television systems, Internet streaming media systems, or other television or video distribution systems. Such systems include user hardware, which may be in the form of a content receiver or set top box that is supported by the media provider or by a third party maintenance service provider. User hardware, in some embodiments, may include display devices configured to receive, process, and present video content provided over a network. Non-limiting examples of such display devices include smart phones, tablet computers, laptop computers, and smart televisions. The user hardware may include content recorders, such as digital video recorder (DVR) devices or other accessory devices inside, or separate from, the content receiver.

As a general matter, the terms "content receiver," "television converter," "receiver," "set top box," "television receiving device," "television receiver," "television recording device," "satellite set top box," "satellite receiver," "cable set top box," and "cable receiver" may be used interchangeably to refer to a converter device or electronic equipment that has the capacity to acquire, process and distribute one or more television signals transmitted by broadcast, cable, telephone or satellite distributors, or Internet service providers who are a source of streaming media. The terms "digital video recorder (DVR)" and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a content receiver. The signals transmitted by these broadcast, cable, telephone, satellite, or other distributors can include, individually or in any combination, Internet, radio, television or telephonic data, and streaming media. One skilled in the art will recognize that a content receiver can be implemented, for example, as an external self-enclosed unit, a plurality of external self-enclosed units, or as an internal unit housed within a television, a computer, or a mobile computing device. One skilled in the art will further recognize that the present disclosure can apply to analog or digital satellite content receivers.

Throughout the specification, the terms "viewer" and "customer" refer to an end user who has a service contract with a media service provider and who has an account associated with the media service provider. Subscriber equipment, such as the aforementioned set top box, resides at a physical location of the subscriber, such as the subscriber's home address. The terms "user" and "viewer" refer to anyone using part or all of the home entertainment system components described herein.

One skilled in the art will recognize that the term "signal" refers to any digital or analog signal. Such signals can include, but are not limited to, a bit, a specified set of bits, or a signal having a waveform whose amplitude varies over time for conveying information. Uses of the term "signal" in the description can include any of these different interpretations. It will also be understood to one skilled in the art that the terms "connected" and "coupled" are not limited to a physical connection but can refer to any means of communicatively or operatively coupling two devices, for example, a wireless connection.

As yet another general matter, it will be understood by one skilled in the art that the term "display device" may refer to a television set, a monitor, a smartphone, or video display that contains an integrated graphic processing device—for example, an internal cable-ready television tuner housed inside a television or that is connected to an external television converter device such as an external set top box connected via cabling to a television. A further example of an external television converter device is a DISH® Network Hopper combination satellite set top box and Digital Video Recorder.

The system 100 of FIG. 1 includes a multimedia content receiver 102 communicatively coupled to a display device 104 and configured to send a video signal 106 to the display device 104 that causes the display device 104 to display visual content on a display 108 thereof. The video signal 106 also includes an audio signal for producing audio content by one or more speakers 110 of or associated with the display device 104. The video signal 106 may be sent to the display device 104 via a wired connection, such as a High-Definition Media Interface (HDMI) cable, or via a wireless connection, such as a common connection to a Wi-Fi router. The video signal 106 is configured such that the visual content and the audio content are synchronized with the visual content such that a viewer 116 perceives the video content presented as a person would experience in real-time. The one or more speakers 110 may be part of the display device 104 or may be communicatively coupled to the display device 104 via a wired connection or a wireless connection (e.g., Bluetooth connection). The content receiver 102 generates the video signal 106 based on video content 112 received over one or more networks 114 (collectively referred to as a "network") to which the content receiver 102 is connected.

The system 100 may include one or more remote control devices 118 configured to communicatively couple with the content receiver 102 to provide user input for controlling operations of the content receiver 102. The remote control device 118 includes one or more input devices, such as buttons, dials, touchscreen, that the viewer 116 may interact with to cause the remote control device 118 to send a signal that causes the content receiver 102 to perform corresponding operations. For instance, the viewer 116 may interact with the remote control device 118 to cause the content receiver 102 to display a menu on the display 108. The viewer 116 may navigate the menu using the remote control device 112 to select the video content 112 to be presented by the display device 104.

The viewer 116 may interact with the content receiver 102, via the remote control device 118, modify the audio content provided in the content signal 106 to filter audio events that may disturb the viewer 116 or others nearby if presented by the speakers 110. The viewer 116 may provide input 120 to the content receiver 102 indicating audio event types that may disturb, alarm, or upset the viewer 116 and that are to be filtered from video content 112 presented by the display device 104. For example, the viewer 116 may navigate a user interface (e.g., presented on the remote control device 118, presented on the display device 104 by the content receiver 102) to provide user input 120 selecting one or more audio event types of a defined set of audio event types to be filtered from the video content 112 for presentation on the display device 104. Based on the user input 120, modification setting information 122 may be generated indicating the audio events to be filtered. The modification setting information 122 may also indicate other settings to be implemented in association with the audio event filtering, as described elsewhere herein.

As a particular example, the viewer 116 may provide user input 120 via the remote control device 118 indicating that audio content of infants crying should be filtered in connection with presentation of the video content 112 on the display device 104. As a result, the signal 106 provided to the display device 104 may include modified audio content in which any audio events detected as having characteristics corresponding to audio of crying infants are excluded, attenuated, replaced, or otherwise filtered. Therefore, audio output 124 from the display device 104 (or the speakers 110) does not include the sound of crying infants or any other audio content selected for filtering.

The system 100 also includes a server 126 remotely located to the content receiver 102 and communicatively coupled with the content receiver 102 over the network 114. The server 126 is a media content distribution server configured to obtain media content and distribute the media content to content receivers over the one or more networks 114. The one or more networks 114 include packet-switched networks, such as a wide area network (WAN), mesh networks, local area networks (LAN), cellular networks, and the like, which communicatively link various processor-based devices discussed herein. The content receiver 102 may communicate with the server 126 to obtain the video content 112 for presentation on the display device 104, as well as obtain information regarding other video content that may be available to the viewer 116. For example, the content receiver 102 may send a request over the network 114 to the server 126 to obtain a listing of the video content available to the viewer 116, and may send a further request to the server 126 to obtain the video content 112 selected by the viewer 116.

The content receiver 102 includes one or more processors and memory storing instructions that, as a result of execution by the one or more processors, cause the content receiver 102 to perform the operations described herein. In some embodiments, the content receiver 102 and the display device 104 may be a single device that receives the video content 112 over the network 114 and that includes the display 108 and the speakers 110 for presenting visual and audio content to the viewer 116. Non-limiting examples of such a device include a smartphone (e.g., Apple iPhone®, Android™ phones), tablet computer (e.g., Apple iPad®, Microsoft Surface®), smart televisions, and laptops. In some embodiments, the remote control device 118 may be a smartphone or tablet computer storing instructions, e.g., in the form of an application or a program, that cause one or more processors of the remote control device 118 to send signals that control operations of the content receiver 102.

In some embodiments, the content receiver 102 may also send the modification setting information 122 to the server 126. Based on the modification setting information 122 received from the content receiver 102, the server 126 may filter audio content from the video content 112 corresponding to the audio event type(s) indicated in the modification setting information 122. In some embodiments, the content receiver 102 may receive the video content 112 and may filter the audio content from the video content 112 corresponding to the audio event type(s) indicated in the modification setting information 122.

The server 126 is a computer system that includes one or more processors and memory storing instructions that, as a result of execution by the one or more processors of the server 126, cause the server 126 to perform the operations described herein. The server 126 is communicatively coupled with data storage 128 storing a plurality of video content 130 that includes the video content 112 selected for presentation on the display device 104. Each instance of the plurality of video content 130 may be a collection of visual data and audio data organized to correspond to a unit of video, such as a show episode or a movie.

The server 126 may also include or be communicatively coupled with a machine learning model 132 that is trained to identify instances of one or more of the defined audio event types in the plurality of video content 130. The machine learning model 132, for example, may be trained to receive a unit of video content 130*a* of the plurality of video content 130 as input and generate event information 134 that identifies occurrences, if any, of a defined audio event type in the video content 130*a*. The event information 134 may include time information, such as a time range in the video content 130*a*, or image frame information, such as a range of frame numbers in the video content 130*a*, that identify the occurrence of an audio event of the defined audio event type in the video content 130*a*. The machine learning model 132 may implement a supervised machine learning algorithm, and unsupervised machine learning algorithm, or a reinforcement learning algorithm to learn to identify one or more of a plurality of defined audio event types.

The machine learning model 132 may be trained according to artificial neural network principles by, for example, providing sets of training data to a neural network model comprising the set of connected nodes and adjusting parameters of the machine learning model 132 to generate event information 134 given a unit of video data as input. As one example, the machine learning model 132 may be generated or trained via supervised or unsupervised learning principles involving, e.g., back propagation algorithms, gradient descent algorithms, and/or Levenberg-Marquardt algorithms to generate the event information 134 based on video data that includes one or more occurrences of the defined audio event types to be detected. Although the machine learning model 132 is shown as being separate from the server 126, the machine learning model 132 may operate as part of the server 126 in some embodiments.

The machine learning model 132 may be trained by initially setting the parameters of the machine learning model 132, such as neural network kernels, and weight vectors and/or biases of the nodes, to initial parameter values. The machine learning model 132 is provided an instance of video data (e.g., an episode of a show) as training data and event information 134 is generated based on the video data (if any occurrences of the defined audio event type are detected). A loss or error may be determined for the event information 134 and the machine learning model 132 is trained by, for instance, back propagating the loss or error with respect to the machine learning parameters, and updating the parameters. Stochastic gradient descent and back propagation methods may be implemented as part of the training to update the parameters and improve performance of the machine learning model 132.

The server 126 may identify, using the machine learning model 132, event information 134 that identifies the occurrences of the defined audio event types in some or all of the plurality of video content 130. In some embodiments, the server 126 may generate the event information 134 without using the machine learning model 132—for example, by identifying occurrences of one or more of the defined audio event types by audio characteristics (e.g., frequency characteristics) in the plurality of video content 130 that correspond to audio characteristics of the defined audio event types. The event information 134 may be associated with the corresponding units of the plurality of video content 130. For example, the event information 134 for the video content 130a may be metadata attached to the video content 130a or metadata stored in the data storage 128 in a storage location associated with the video content 130a. The server 126 may transmit the event information 134 for the video content 112 as part of or in connection with transmitting the video content 112.

Figure 2:
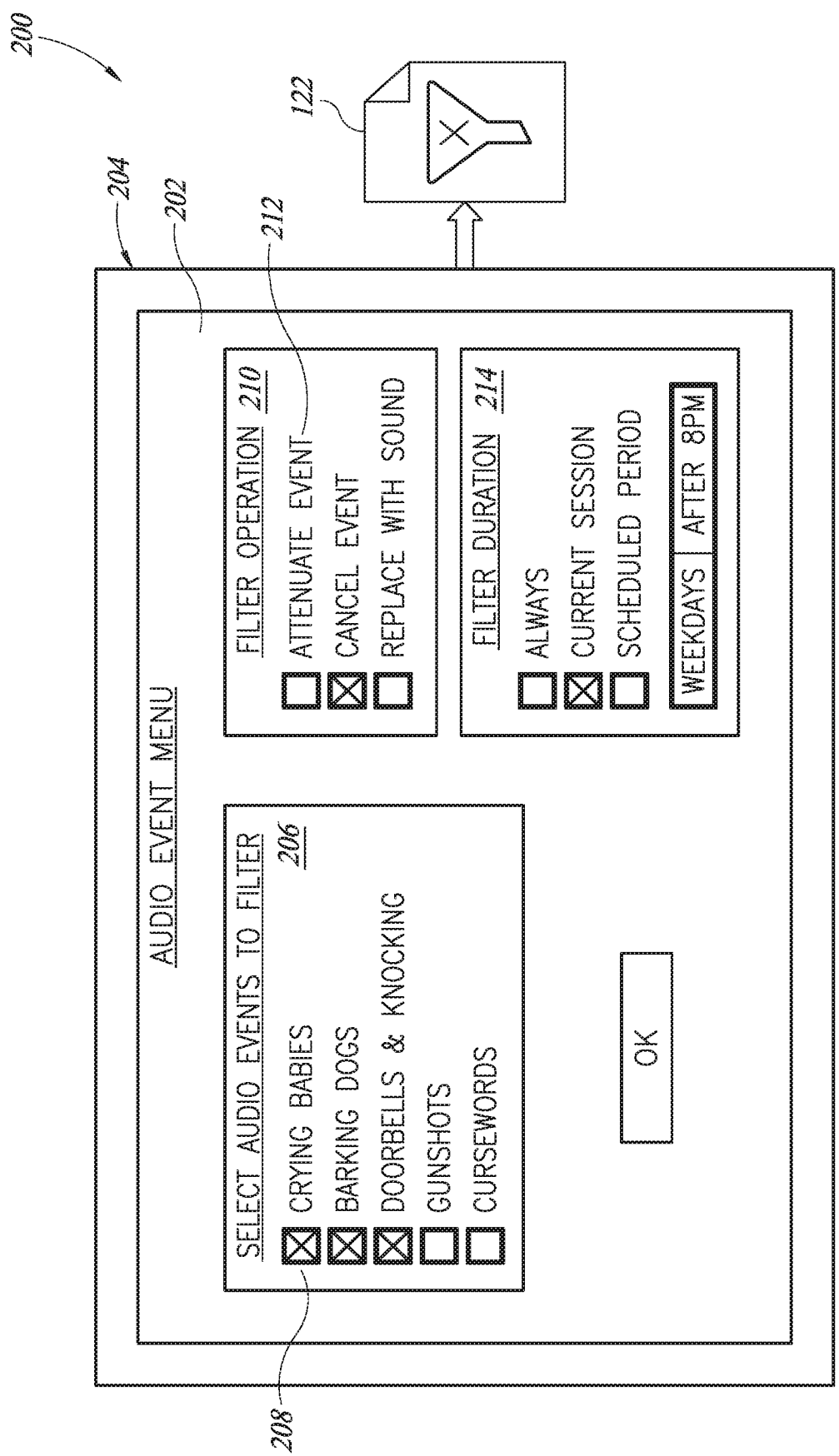
FIG. 2 is a view of a user interface presented on a display device of a multimedia system in the environment of FIG. 1.

FIG. 2 shows a view of an example user interface 200 presented for facilitating user selection of audio events to be filtered from video content according to one or more embodiments. The user interface 200 is presented on a display 202 of a display device 204 of the system 100. The display device 204 stores a set of instructions in memory thereof that, as a result of execution by one or more processors, cause the display device 204 to display and perform operations described herein. The user interface 200 may be generated by the content receiver 102 and presented on the display device 104 in response to the signal 106 provided by the content receiver 102. In some embodiments, the user interface 200 may be presented in an application or a program running on a user device separate from the display device 104, such as a user's smartphone—for example, in a proprietary application or a web browser.

The user interface 200 includes a first section 206 for selecting one or more defined audio event types 208 to be filtered from the video content to be displayed. The defined audio event types 208 shown in the example user interface 200 include a crying infants audio event type, a barking dogs audio event type, a doorbells & knocking audio event type, a gunshots audio event type, and a curse words audio event type. Each of the defined audio event types 208 corresponds to an audio event that, if emitted by an audio output of the display device 204 (e.g., the speakers 110), may disturb, disrupt, or alarm the viewer 116 or others nearby. A user may select none, some, or all of the defined audio event types 208 for filtering from the video content. The defined audio event types 208 shown and described herein are non-limiting examples; in other embodiments, the user interface 200 may include additional or fewer defined audio event types than shown and described.

The user interface 200 may include a second section 210 for selecting one or more defined modification operations 212 for filtering the selected defined audio event types 208 in the first section 206. The defined modification operations 212 shown include an operation for attenuating occurrences of the selected defined audio event types detected in video content 112. Attenuating includes reducing the amplitude of the occurrence of a selected defined audio event type, such as by reducing the volume of the audio event or muting the audio event. The defined modification operations 212 shown also include an operation for canceling occurrences of the selected defined audio event types detected in the video content 112—for example, by introducing an audio event having a waveform that destructively interferes with a waveform of the detected defined audio event. The defined modification operations 212 shown further include an operation for replacing occurrences of the selected defined audio event types detected in the video content 112 with a different audio event. Detected occurrences of curse words, for example, may be replaced with a different selected audio event, which may be selected by the user as a more preferable alternative. In some embodiments, a defined modification operation 112 may be associated with each defined audio event 208 selected in the first portion 206. For example, a user may select that a cancelling operation is to be performed for detected occurrences of barking dog audio events and select that a sound replacement operation is to be performed for detected occurrences of crying infant audio events.

The user interface 200 may include a third section 214 having setting for scheduling time periods in which selected defined audio events are to be filtered. For example, the user may elect in the third section 214 to implement filtering for the selected defined audio events "always" for filtering the selected defined audio events 24 hours a day and seven days a week until such settings are changed. The user may elect to implement filtering for the current session, such as during presentation of the video content currently presented or that is about to be presented on the display device 104, or for a defined time period on certain days of the week.

The modification setting information 122 may be generated as a result of user submission of the selected audio event filtering settings in the user interface 200. The modification setting information 122 indicates the defined audio event types selected by the user to be filtered from video content and may indicate other modification setting information, such as the modification operations to be performed and the scheduled time periods during which the audio events are to be filtered. The modification setting information 122 may be generated, based on settings selected in the user interface 200, by the content receiver 102, a user device separate from the content receiver 102 (e.g., smartphone), or by the server 126.

Figure 3:
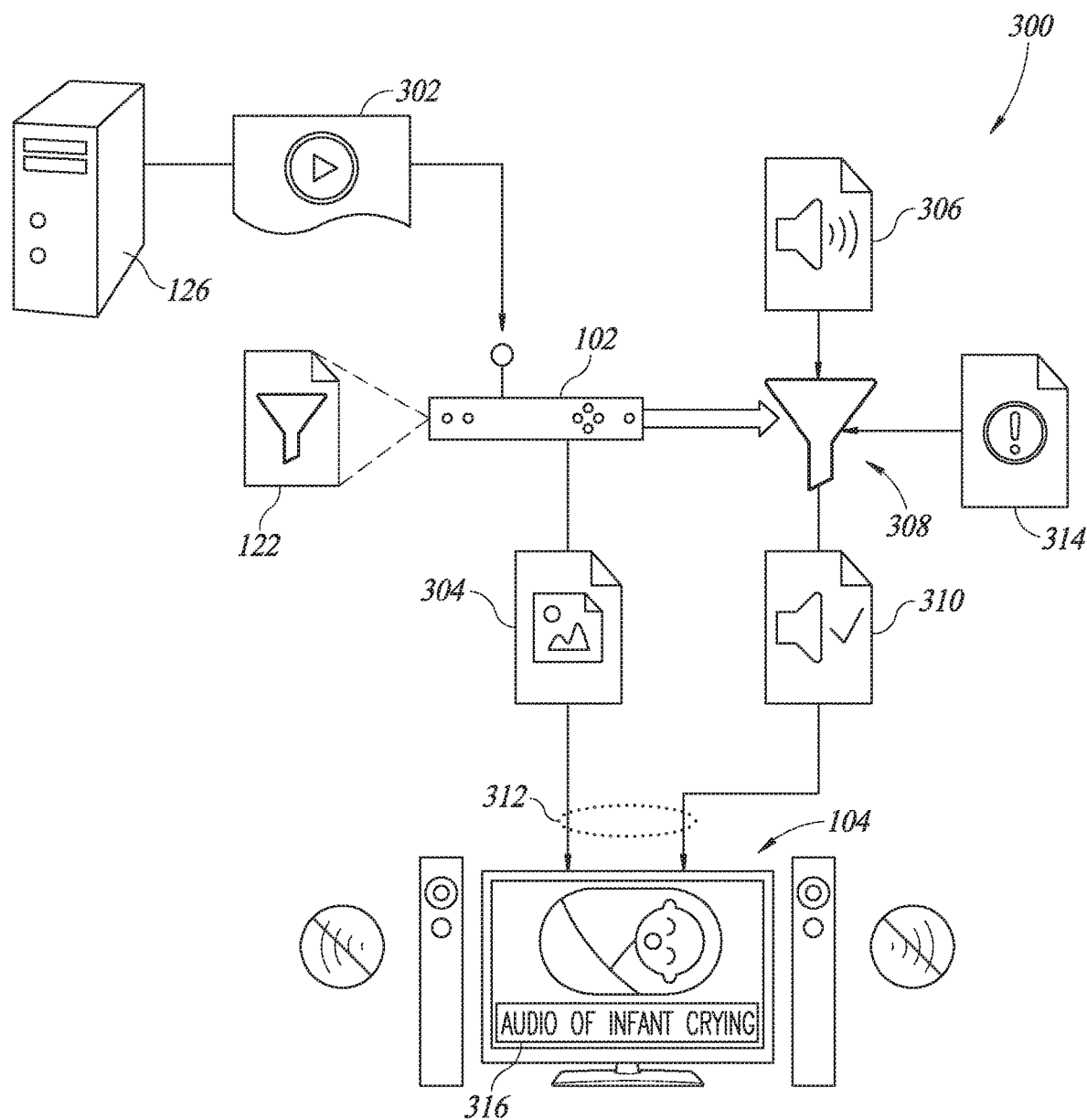
FIG. 3 is a diagram of an environment in which audio content associated with video content is filtered for presentation on a display device according to one or more embodiments.

FIG. 3 shows an environment 300 in which occurrences of defined audio event types are filtered from video content for presentation on a display device according to one or more embodiments. In the environment 300, the server 126 sends, over the network 114 to the content receiver 102, video content 302 selected by a viewer for presentation on the display device 104. The video content 302 includes visual content 304 and audio content 306. The content receiver 102 performs a modification operation 308 in which detected occurrences of audio events in the audio content 306 that correspond to the defined audio event types in the modification setting information 122 are filtered to generate modified audio content 310. The content receiver 102 sends the modified audio content 310 and the visual content 304 to the display device 104 as a collection of signals 312 that the display device 104 synchronously presents as audio and video to the viewer.

In some embodiments, the server 126 generates and sends event information 314 to the content receiver 102 as a part of or in association with the video content 302. The event information 314 may include temporal information, such as time ranges in the audio content 306 and/or image frame ranges, in which occurrences of one or more defined audio event types were detected in the video content 302. The event information 314 may include information identifying the defined audio event type that was detected for each occurrence. For example, the event information 314 may specify that audio of an animal noise (e.g., dog barking, cat meowing) was detected as beginning at a first time in the audio content 306 and ending at a second time in the audio content 306. The content receiver 102 may filter the audio based on the modification setting information 122, such as by filtering audio events corresponding to the defined audio events and modification operation type specified in the modification setting information 122. In some embodiments, the server 126 may generate the event information 314 based at least in part on information provided by viewer identification of defined audio events in the video content 302 during or in connection with playback of the audio content 306.

In some implementations, the server 126 may not provide modification setting information 122 to the content receiver 102 in association with the video content 302. In such implementations, the content receiver 102 may detect the occurrences of the defined audio event types to be filtered from the audio content 306 prior to or as part of the modification operation 308.

The modification operation 308 may correspond to one or more types of modification operations described herein. For instance, the modification operation 308 may include active audio cancellation in which the content receiver 102 generates information for producing an audio signal having a waveform that is inverted with respect to a waveform of a defined audio event identified in the audio content 306. This may include identifying the waveform of the defined audio event in the audio content 306 according to characteristics that correspond to the defined audio event type, such as by frequency characteristics and duration. As another example, the modification operation 308 may include attenuating the volume of a defined audio event identified in the audio content 306. As a further example, the modification operation 308 may include or replacing the defined audio event identified in the audio content 306 with a different defined audio event.

Performing the modification operation 308 may involve providing a time delay between a first time when the content receiver 102 receives the video content 302 and a second time when the content receiver 102 outputs the signals 312 to the display device 104. The content receiver 102 may evaluate whether the audio content 306 in the video content 302 includes defined audio events and preprocess all of the audio content 306 using the modification operation 308 if one or more defined audio events are identified, which may cause a time delay between the first and second times. Thereafter, the content receiver 102 may begin providing the signals 312 to the display device 104 after the time delay. In some embodiments, the content receiver 102 may process the audio content 306 as the signals 312 are provided to the display device 104. In such embodiments, the content receiver 102 may wait for a certain time period after the first time to begin outputting the signals 312 to provide a buffer in which the content receiver 102 can identify defined audio events, if any, in the audio content 306 and filter the identified defined audio events using the modification operation 308. The content receiver 102 may determine an appropriate time period for delay based on information identifying a size, type, or length of the video content 302—for example, the content receiver 102 may select a long time delay period for video content 302 in a certain time range or in a certain range of data size. As a result, when viewing the visual content 304 in connection with the modified audio content 310, the viewer 116 viewing the display device 104 does not perceive any delay or buffering in the video playback due to performance of the modification operation 308 to generate the modified audio content 310 included in the signals 312.

In some embodiments, the modification operation 308 includes providing a visual indication regarding the defined audio events that were modified in the audio content 306. The content receiver 102 may include, in connection with the visual content 304, a visual indicator 316 that indicates that the defined audio event of a particular type was modified in the audio content 306. The visual indicator 316 may be an image (e.g., an icon) or text that is superimposed over or on the visual content 304 displayed on the display device 104. For example, in response to detection of a defined audio event of an infant crying, the visual indicator 316 may be text (e.g., closed captioning text) superimposed on the visual content 304 displayed on the display device indicating that audio of an infant crying occurred in the audio content 306. As another example, for detection of a defined audio event of a dog barking, the visual indicator 316 may be an image (static or moving) of a dog barking. As a result of providing the visual indicator 316, the viewer is still provided with context regarding events in the video content 302 but is not disturbed or disrupted by the defined audio events detected. The visual indicator 316 is inserted in or otherwise included with the visual content 304 during a time frame associated with the occurrence of the defined audio event in the audio content 306. The visual indicator 316 may be included with the visual content 304 based on the event information 314—for example, the visual indicator 316 provided may correspond to the defined audio event type (e.g., infant crying event type, doorbell event type) included in the event information 314.

Figure 4:
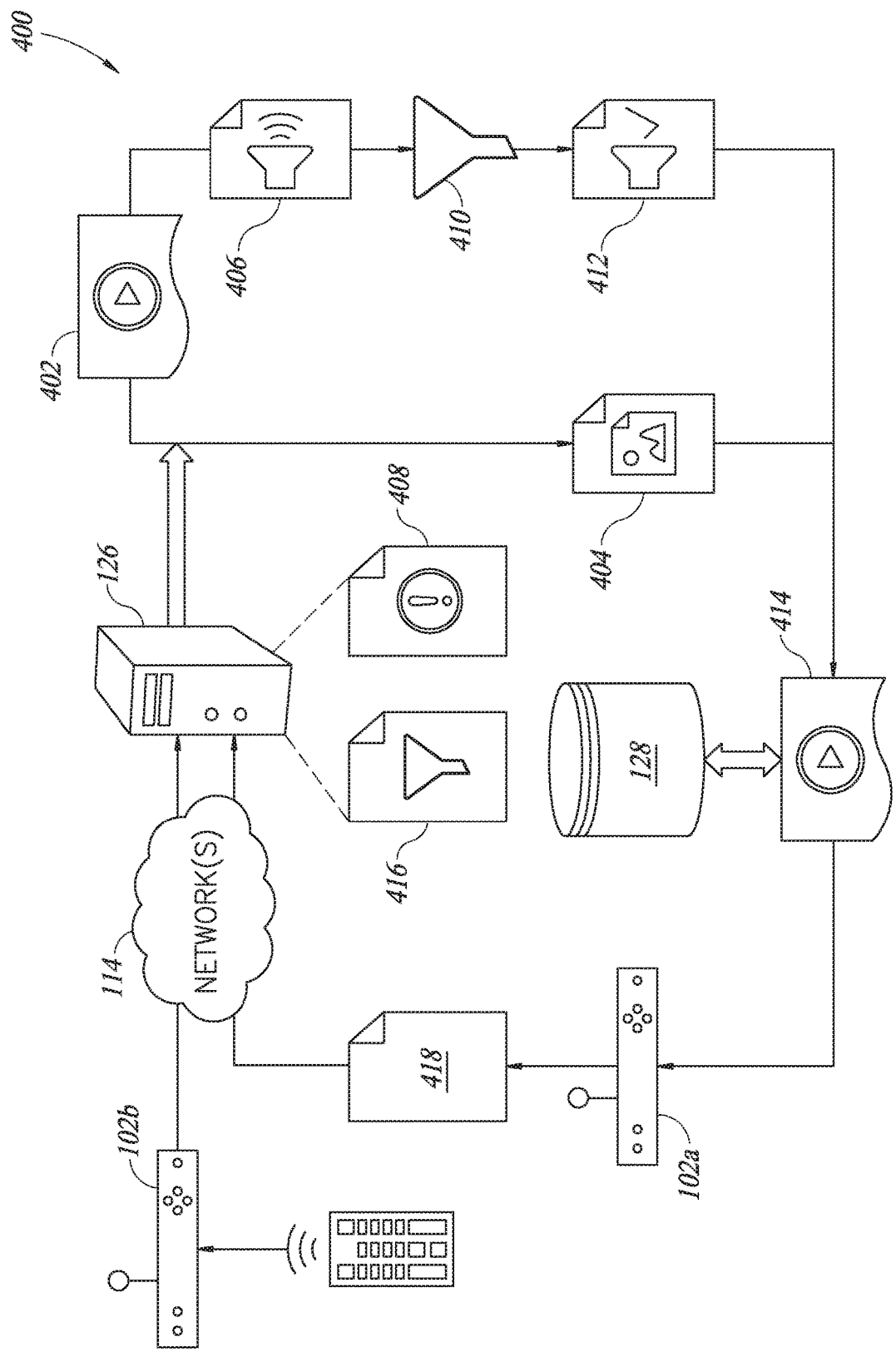
FIG. 4 is a diagram of an environment in which audio content associated with video content is filtered prior to transmission to a remotely located system according to one or more embodiments.

The server 126 may, in some embodiments, may process video content to filter occurrences of defined audio events therein before or in connection with providing the video content to the content receiver 102. FIG. 4 shows an environment 400 in which occurrences of defined audio event types are filtered from video content for presentation on a display device according to one or more embodiments. In the environment 400, the server 126 identifies and filters occurrences of the defined audio events in video content 402. The server 126 obtains, from data storage 128, the video content 402 that includes visual content 404 and audio content 406. The server 126 may identify occurrences of the defined audio events in the audio content 406 and may generate event information 408 identifying the occurrences of the defined audio events—for instance, information identifying the defined audio event type and temporal information regarding when the defined audio event occurs in the audio content 406.

The server 126 performs a modification operation 410 to filter the occurrences of the defined audio events identified in the audio content 406 to generate modified audio content 412 in which the defined audio events are replaced, attenuated, cancelled, or otherwise modified. The modified audio content 412 is associated with the visual content 404 to produce modified video content 414, which may be stored in the data storage 128 for later transmission to a content receiver 416 over the network 114 for presentation on the display device 104. In some embodiments, the modified audio content 412 and the audio content 406 may be stored in the data storage 128 in association with the visual content 404.

The modification operation 410 performed on the audio content 406 may be based on the modification setting information 416 corresponding to the content receiver 102 to which the modified video content 414 is to be provided. For example, a content receiver 102a may send a request 418 over the network 114 to the server 126 to provide the video content 402. The server 126 may receive, with the request 418, the modification setting information 416 regarding filtration of the defined audio events with the request or may have previously received the modification setting information 416 for the particular content receiver 102a. The server 126 may then perform the modification operation 410 corresponding to the modification setting information 416 and provide the modified video content 414 to the content receiver 102a. The server 126 may provide the modified video content 414 as a stream of data that includes both the video content 404 and the modified audio content 412. The server 126 may also include a visual indicator indicating the audio event type detected in modified in the audio content 406, as described above with respect to the visual indicator 316 of FIG. 3. In some embodiments, the visual indicator provided by the server 126 may be information included in the event information 408 specifying that the content receiver 102 should provide a visual indication corresponding to the defined audio event detected at a particular time during playback. In some embodiments, the visual indicator provided by the server 126 is superimposed or included with image information of the image content 404.

Figure 5:
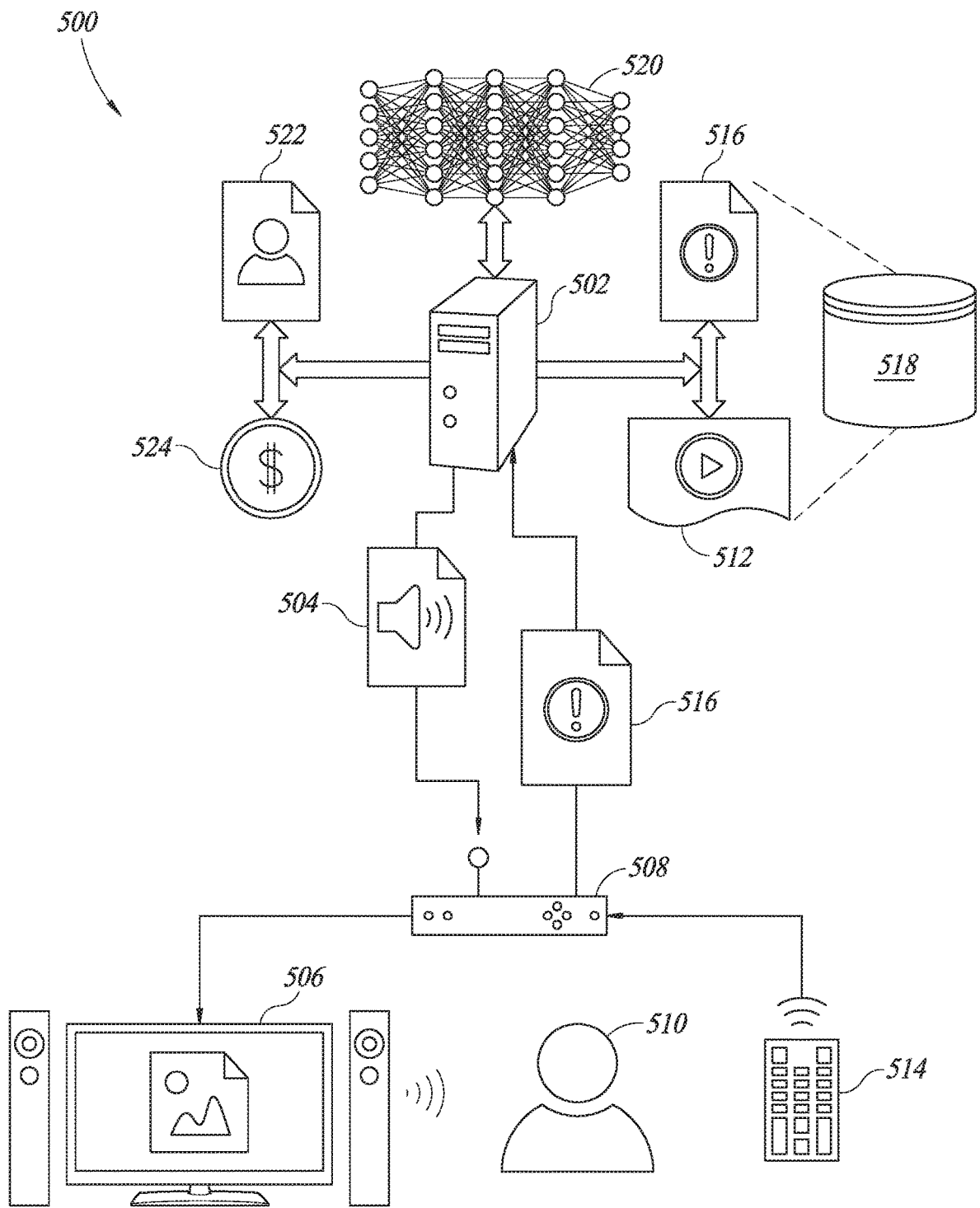
FIG. 5 is a diagram of an environment in which defined audio events are identified in video content according to one or more embodiments.

The server 126 may identify occurrences of the defined audio events in the video content 402 based on user input provided via other content receivers 102b or user devices (e.g., smartphones). FIG. 5 shows an environment 500 in which a server 502 identifies occurrences of defined audio events in audio content 504 according to one or more embodiments. A display device 506 coupled to a content receiver 508 may present a request to a viewer 510 to identify occurrences of one or more of the defined audio event types in audio content. For example, the viewer 510 may be presented with a dialog box requesting the viewer 510 to identify occurrences of dogs barking in a clip of audio content. The dialog box may offer the viewer 510 benefits for accepting the offer, such as credit toward accessing premium media content.

In response to the viewer 510 providing input agreeing to the request, the content receiver 508 presents the audio content 504, obtained from the server 502, to be evaluated by the viewer 510 for occurrences of one or more defined audio event types. The audio content 504 is part of video content 512, which may be transmitted to the content receiver 508 along with the audio content 504 in some embodiments. In some embodiments, the server 502 may transmit the audio content 504 to the content receiver 508 without the corresponding visual content of the video content 512. The viewer 510 interacts with an input device 514, such as a remote control device that is configured to communicate with the content receiver 508, to provide information regarding whether audio presented to the viewer 510 by the display device 506 includes a defined audio event type. The information provided by the viewer 510 may further include temporal information specifying a time range in the audio content 504 at which a defined audio event occurs (e.g., beginning time, duration, end time). In some implementations, the input device 514 may be a smartphone, tablet computer, etc., that includes an application or program in which the viewer 510 can provide information regarding the occurrence of a defined audio event.

The content receiver 508 receives the information from the input device 514 and provides event information 516 to the server 502 identifying occurrences, if any, of one or more defined audio events in the audio content 504. The event information 516 may specify the defined audio event type identified and may specify temporal information regarding when the one or more defined audio events occur in the audio content 504. The server 502 may store the event information 516 in the data storage 518 in association with the video content 512 corresponding to the audio content 504 evaluated by the viewer 510.

The server 502, in some implementations, may use the event information 516 as training data to train a machine learning model 520 to identify occurrences of defined audio events in audio content. For instance, the event information 516 may be provided to the machine learning model 520 along with the video content 512 and/or audio content 504 as training data according to supervised learning techniques, unsupervised learning techniques, and/or reinforcement learning techniques. Therefore, the proficiency of the machine learning model 520 to identify defined audio events of one or more types may be improved using viewer 510 provided feedback. In some implementations, the server 502 may be configured to reward the viewer 510 in exchange for identifying audio event types in the audio content 504. For instance, the server 502 may supply an account 522 of the viewer 510 with credits 524 or other benefits in response to receiving input from the viewer 510 regarding occurrences of the defined audio events in the audio content 504 presented.

Figure 6:
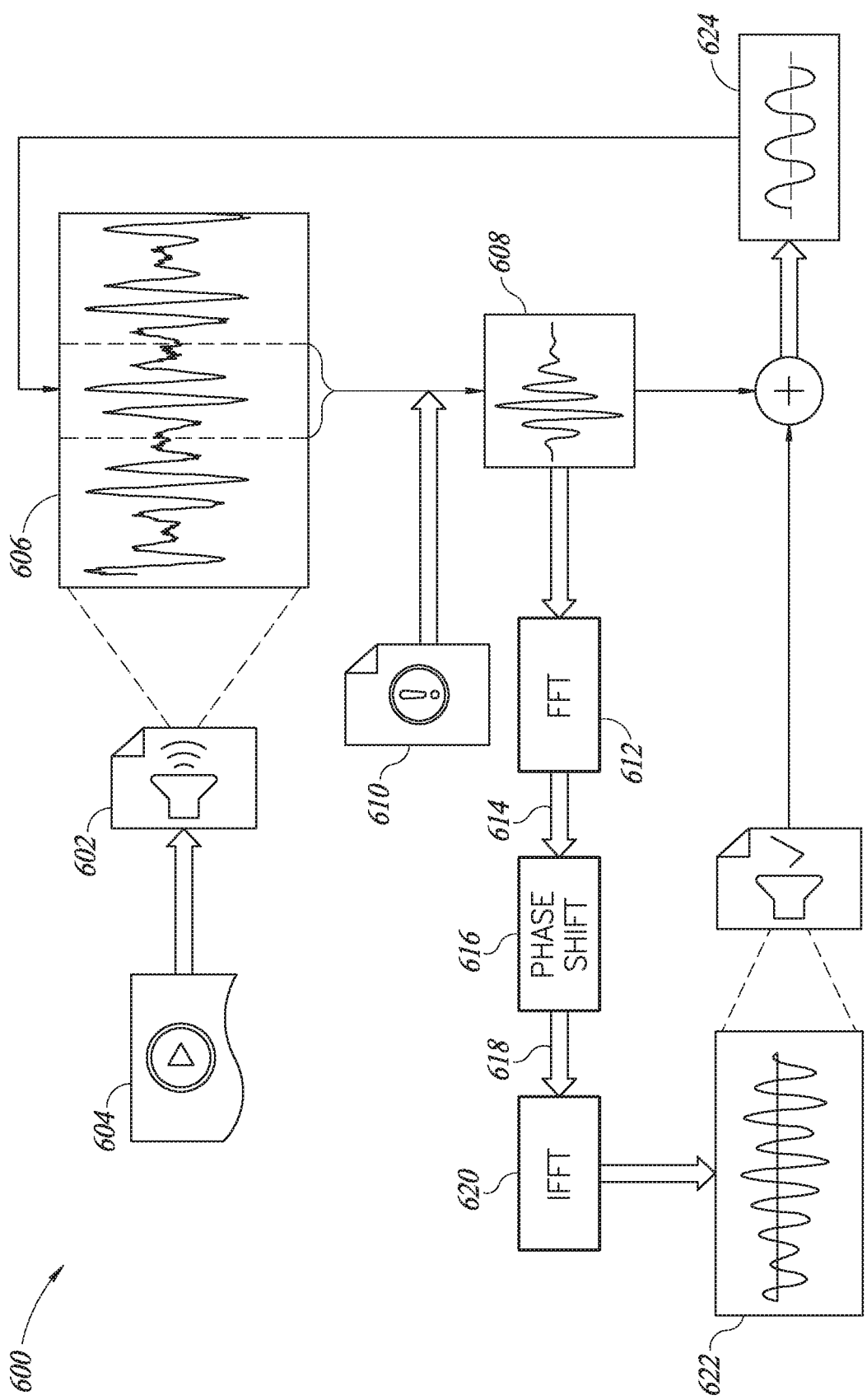
FIG. 6 is a diagram of a first example process for modifying audio content of video content.

FIG. 6 shows a process 600 for performing a modification operation for filtering an occurrence of a defined audio event in video content according to one or more embodiments. The process 600 may be performed by one or more processors of a content receiver or a server described herein based on modification settings of a viewer. The process 600 corresponds to a first implementation of the modification operation 308 described with respect to FIG. 3 and elsewhere herein. The process 600 involves an active noise cancelling procedure in which modified audio content is introduced that cancels or reduces a waveform of the defined audio event via destructive interference.

In the process 600, audio content 602 is obtained from video content 604 that is identified as including one or more defined audio events. The audio content 602 has a waveform 606 in which a segment 608 is identified as corresponding to a defined audio event. Event information 610 may be associated with the audio content 602 that specifies the segment 608, for example, as a time range in the audio content 602 or as corresponding to a collection of image frames in the video content 604. The event information 610 may further specify the type of defined audio event corresponding to the segment 608—for example, by indicating an alphanumeric value identifying the segment 608 as including audio of a dog barking. The one or more processors may extract, copy, or otherwise obtain the segment 608 from the audio content 602 for processing to cancel the defined audio content.

The segment 608 is processed via an active noise cancellation procedure in which a waveform is generated that cancels the defined audio event in the segment 608 via destructive interference. The segment 608 may be provided as input to a Frequency Domain Transform 612 to obtain frequency content 614. By way of non-limiting example, the one or more processors may execute a set of instructions that cause the processor(s) to perform a Fast Fourier Transform (FFT), a Short-Time Fourier Transform (STFT), or Discrete Fourier Transform (DFT) on the segment 608 to obtain the frequency content of the segment 608. In general, the Frequency Domain Transform 612 includes operations that transform a time-domain signal of the segment 608 to a frequency-domain signal having the frequency content 614 of the segment 608. The process 600 then proceeds to phase shift 616 a phase of the frequency content 614 obtained by a fixed amount π (or a multiple thereof) to generate a shifted response 618.

The phase shift 616 may include identifying one or more dominant frequencies in the frequency content 614, such as by identifying an integer number N of the most dominant frequencies in the frequency content. The dominant frequencies are those that contain the highest amount of energy in the spectrum of the frequency content 614. The dominant frequencies may correspond to the loudest or most prominent sounds in the segment 608 that correspond to the defined audio event types. In television productions, for example, the sound of knocking on doors or door bells is often a prominent sound in audio that can disrupt a viewer or those around the viewer. The frequency content of the dominant frequencies can be extracted from the frequency content 614 and then the frequency content of the dominant frequencies can be phase shifted by the fixed amount to obtain the shifted response 618. In some embodiments, the entire frequency content 614 may be phase shifted by the fixed amount to obtain the shifted response 618. Certain frequency ranges may be excluded from identification of the dominant frequencies—for example, dominant frequencies in a frequency range between 90 Hz and 250 Hz, which is the frequency range of adult human voices, may not be phase shifted in 616.

Thereafter, the shifted response 618 is provided as input to an Inverse Fourier Transform 620 to obtain a time-domain signal 622 of the shifted response 618. In the Inverse Fourier Transform 620, the one or more processors may execute a set of instructions that cause the processor(s) to perform an Inverse Fast Fourier Transform or an Inverse Discrete Fourier Transform on the shifted response 618 to generate the time-domain signal 622. The one or more processors provide the time-domain signal 622 to be presented with the segment 608 of the video content 602 during playback. In particular, the time-domain signal 622 has a waveform shape that has amplitudes opposite to the defined audio event detected in the segment 608. As a result, when the time-domain signal 622 is presented along with the segment 608, the defined audio event is cancelled by the opposing amplitudes of the time-domain signal 622.

The time-domain signal 622 may be mixed or added with the segment 608 to generate modified audio content 624 in which the defined audio event is cancelled. The segment 608 may be replaced with the modified audio content 624 such that the modified audio content 624 is played on speakers of the display device instead of the segment 608. Therefore, the perception of the occurrence of the defined audio event in connection with playback of the video content 604 is diminished or eliminated. In some embodiments, wherein the dominant frequencies of the frequency content 614 are identified and shifted, sounds other than the defined audio event(s) may still be perceptible by the viewer. For instance, sound (e.g., background noise) other than the defined audio events in the segment 608 may remain in the modified audio content 624 such that the viewer can perceive other meaningful audio content in the segment 608 when viewing the video content 604.

Figure 7:
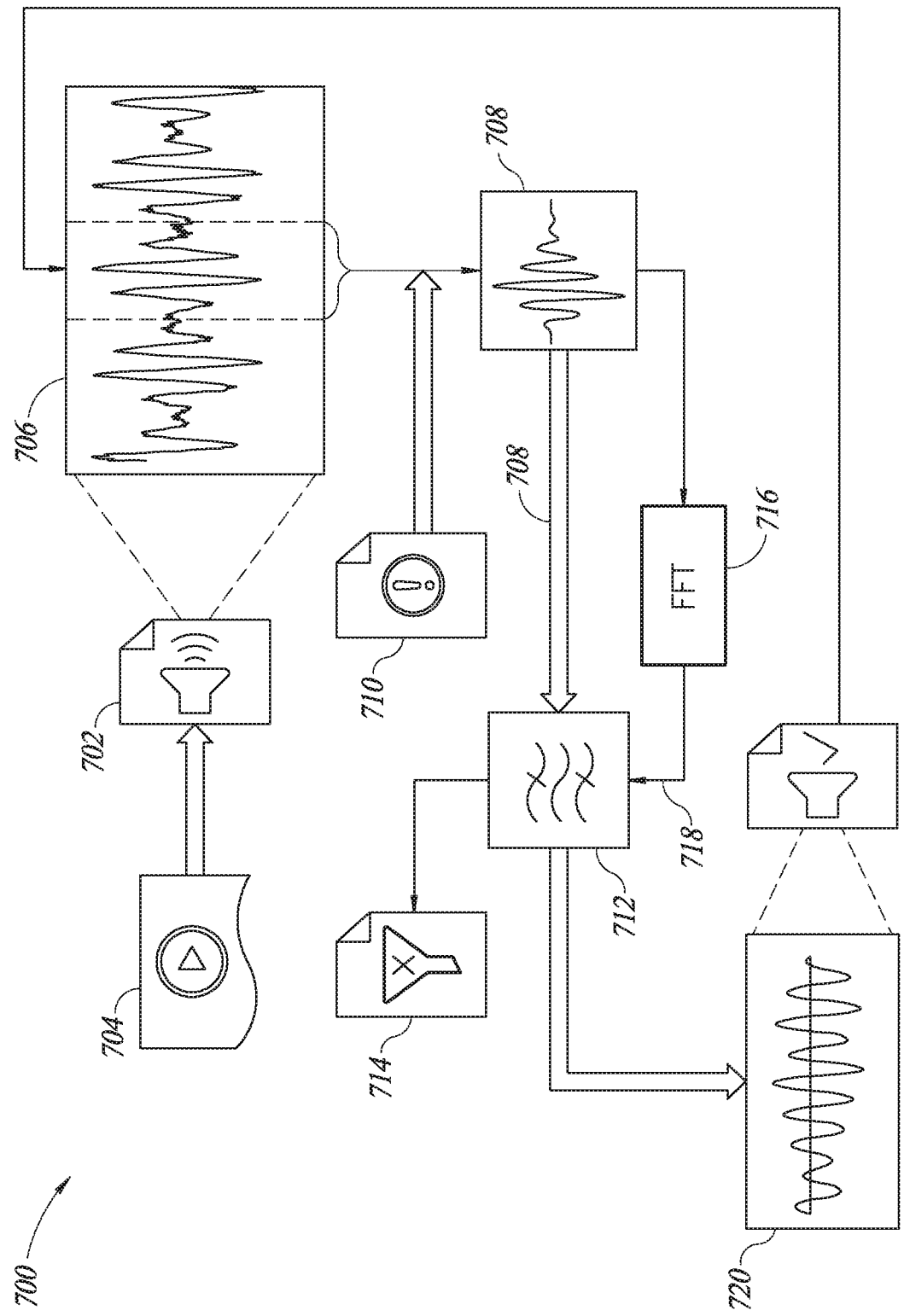
FIG. 7 is a diagram of a second example process for modifying audio content of video content.

FIG. 7 shows a process 700 shows a process for performing a modification operation for filtering an occurrence of a defined audio event in video content according to one or more embodiments. The process 700 may be performed by one or more processors of a content receiver or a server described herein based on modification settings of a viewer. The process 700 corresponds to a second implementation of the modification operation 308 described with respect to FIG. 3 and elsewhere herein. The process 700 involves applying a digital signal filter to audio content in which a defined audio event is identified. Some portions of the process 700 are similar to the process 600, so further description thereof is limited for brevity.

In the process 700, audio content 702 is obtained from video content 704 that is identified as including one or more defined audio events. The audio content 702 has a waveform 706 in which a segment 708 is identified as corresponding to a defined audio event. As described above with respect to the process 700, event information 710 may specify that the segment 708 includes a defined audio event, e.g., as a time range in the audio content 702 or as a set of image frames in the video content 704. The one or more processors may extract, copy, or otherwise obtain the segment 708 from the audio content 702 for processing to filter the defined audio events.

The defined audio events in the segment 708 are removed by filtering particular frequencies corresponding to the defined audio event types. The one or more processors may determine frequencies to be filtered from the segment 708 based on the defined audio event types selected by a viewer in the event information 710 for removal. Each defined audio event type may have associated therewith a corresponding set of frequencies indicated in memory coupled to the one or more processors. The one or more processors may determine one or more filters 712 to be applied to the segment 708 according to modification setting information 714 for a viewer requesting to view the video content 704. The one or more filters 712 may be implemented as digital signal filters. The one or more filters 712, for example, may include a Butterworth filter or a band-stop filter having a configuration (e.g., order, frequency center, frequency cut-off) that correspond to a frequency range of a corresponding defined audio event type to be filtered. As a particular example, modification setting information 714 for a viewer may indicate that a viewer selects dog barking and doorbell audio event types to be filtered from the video content 704. As a result, the one or more processors may determine a first filter that attenuates a set of frequencies corresponding to dog barking audio events and a second filter that attenuates a set of frequencies corresponding to doorbell audio events.

In some implementations, the one or more processors may determine the one or more filters to be applied to the segment 708 based on frequency characteristics of the segment 708. For example, the one or more processors may determine dominant frequency components in the segment 708 that correspond to the defined audio events to be filtered and then generate one or more filters 712 to attenuate the dominant frequency components. The filters 712 may be specifically configured to attenuate the dominant frequency components detected without removing other sound in the segment 708 that may contribute to viewing of the video content 704. The one or more processors may determine the dominant frequency components by performing a Frequency Domain Transform 716 on the segment 708 and evaluating frequency content 718 provided as an output of the Transform 716. The Frequency Domain Transform 716 may involve performing an FFT, STFT, DFT, or other appropriate time-to-frequency domain transform to obtain the frequency content of the segment 708.

The one or more processors may evaluate the frequency content 718 and identify the dominant frequency components present in the set of frequencies that correspond to the defined audio event types specified in the modification setting information 714. For instance, information stored in memory may specify that occurrences of a defined audio event type specified in the modification setting information 714 are in one or more frequency ranges—for example, that dog barking audio events to be filtered have dominant frequency components between 1 kHz and 2 kHz. The one or more processors may identify dominant frequency occurrences in the 1-2 kHz frequency range in the frequency content 718, such as a dominant frequency component centered around 1.3 kHz. In response, the one or more processors may then generate and apply a filter 712 (e.g., band-stop filter) centered at the 1.3 kHz dominant frequency component and that has a range (e.g., start and stop frequencies) and order sufficient to attenuate the signals that satisfy a criterion related to amplitude around the 1.3 kHz dominant frequency component. For example, generating and applying a filter 712 that has a sufficient order to attenuate frequency components in a certain spectral density of the segment 708 by 40 decibels. As a result, the one or more filters 712 generated are configured based on the dominant frequency components identified in the segment 708 as corresponding to the defined audio event types specified in the frequency setting information 714.

The one or more processors provide the segment 708 as an input to the one or more filters 712. The one or more processors obtain a modified audio segment 720 as an output from the one or more filters 712, the modified audio segment 720 being filtered of frequency content corresponding to the one or more defined audio event types specified in the frequency setting information 714. The one or more processors may substitute or replace the segment 708 in the audio content 702 with the modified audio segment 720. When the modified audio segment 720 is played by the speakers associated with the display device, the viewer(s) and others nearby may not perceive the defined audio events that occurred in the segment 708.

Figure 8:
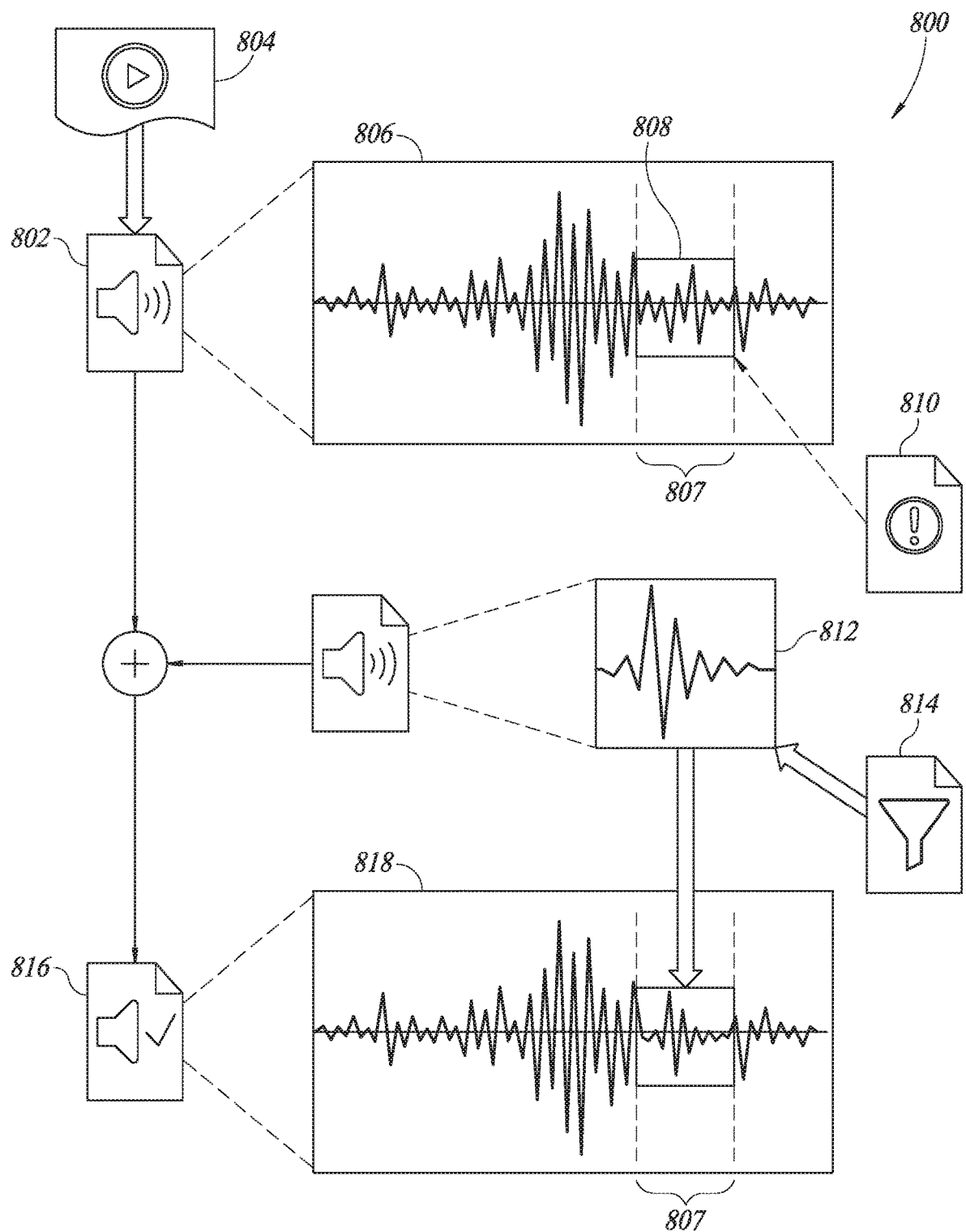
FIG. 8 is a diagram of a third example process for modifying audio content of video content.

Instead of the filtering processes 600 and 700, a replacement procedure may be performed in which a segment of the audio content identified as containing a defined audio event is replaced with an alternative audio segment that does not contain the defined audio event. FIG. 8 shows a process 800 for replacing an audio segment of video content with a different segment according to one or more embodiments. The process 800 may be performed by one or more processors of a content receiver or a server described herein based on modification settings of a viewer. The process 800 corresponds to an alternative implementation of the modification operation 308 described with respect to FIG. 3 and elsewhere herein.

In the process 800, audio content 802 is obtained from video content 804 that is identified as including one or more defined audio events. The audio content 802 has a waveform 806 in which a segment 808 is identified as corresponding to a defined audio event. The segment 808 is located at a time range 807 of the As described above with respect to the process 600 and elsewhere herein, event information 810 may specify that the segment 808 includes a defined audio event, e.g., as a time range in the audio content 802 or as a set of image frames in the video content 804. The one or more processors may extract, copy, or otherwise obtain the segment 808 from the audio content 802 for processing to remove the defined audio events.

The one or more processors determine that the segment 808 contains a defined audio event based on event information 810. Thereafter, the processor(s) determine replacement audio content 812 comprising a collection of audio data (e.g., a file) that is to replace the defined audio event. In some implementations, the replacement audio content 812 may be determined based on viewer preferences indicated in the modification setting information 814—for example, the viewer may specify that defined audio events of a first type are to be replaced by a corresponding viewer selected sound clip. The replacement audio content 812 may be selected by the viewer prior to or in connection with a request for playback of video content. The replacement audio content 812 may be stored in the data storage 128 and may be audio content provided by the viewer or obtained by a content provider. In some implementations, the replacement audio content 812 may be selected by the one or more processors from a collection of curated or predetermined replacement audio content, which may be selected by an authorized entity (e.g., an employee of a content distribution service).

There may be a mismatch in characteristics between the segment 808 to be replaced (or the defined audio event therein) and the replacement audio content 812 selected. The one or more processors may be configured to detect a mismatch in characteristics between the replacement audio content 812 and the segment 808, and modify the replacement audio content 812 to match or conform with characteristics of the segment 808. By way of non-limiting example, the length of the segment 808 may be different than the replacement audio content 812. In such situations, the one or more processors may append silence to the replacement audio content 812 or remove a portion of the replacement audio content 812. As another example, a volume (e.g., root-mean squared value) of the segment 808 may be different than the replacement audio content 812. The one or more processors may adjust the volume of the replacement audio content 812 to match the volume of the segment 808.

The one or more processors may generate modified audio content 816 for the video content 804 in which the replacement audio content 812 is presented instead of the segment 808 during playback. In some embodiments, the modified audio content 816 may be generated by altering the data of the audio content 802 such that data of the replacement audio content 812 is inserted into in the audio content 802 at the time range 807 of the audio content 812 and data of the segment 808 is removed. In some embodiments, the replacement audio content 812 may be associated with the time range 807 such that the one or more processors provide the replacement audio content 812 with the visual content corresponding to the time range 807. Modified audio content 818 may be provided, e.g., as a data stream or an electronic signal, that includes the replacement audio content 812 and the other portions of the original audio content 802.

The event information 810 of the video content 804 may indicate that, for the time range 807, the replacement audio content 812 is to be presented instead of the segment 808. For example, the event information 810 may indicate that the replacement audio content 812 is to be played for viewers having modification setting information 814 specifying that defined audio events corresponding to the segment 808 are to be filtered. In such scenarios, the original replacement audio 802 remains preserved and the replacement audio content 812 stored in memory in association with the video content 804 so that the replacement audio content 812 may be obtained and provided as replacement audio for the segment 808. When the visual content corresponding to the time range 807 is provided, the one or more processors may transmit or stream audio corresponding to the replacement audio content 812 to the content receiver 102 and stream the original audio content for other portions of the video content 804.

Figure 9:
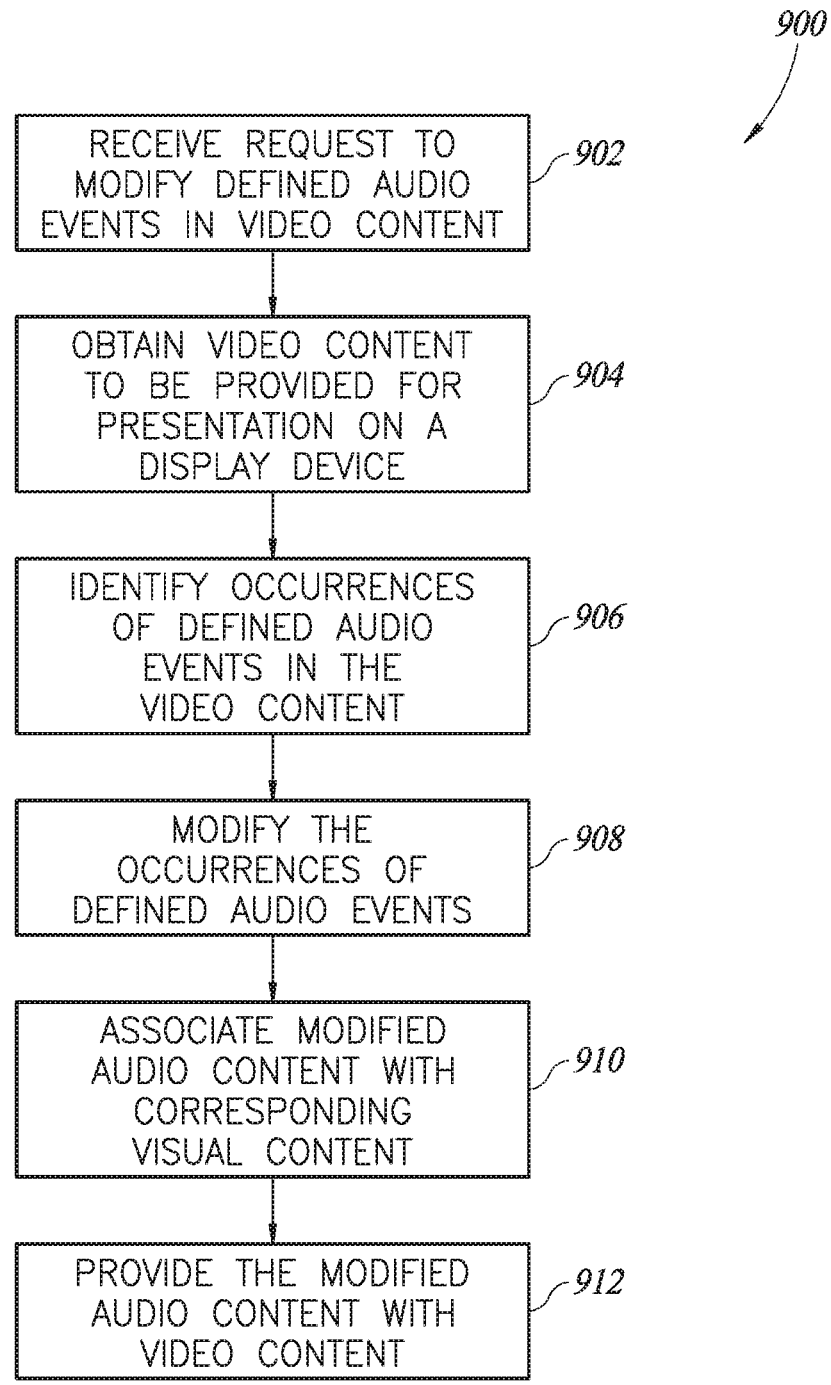
FIG. 9 is a method for modifying audio content associated with video content for presentation on a display device.

FIG. 9 shows a method 900 for modifying audio content associated with video content for presentation on a display device according to one or more embodiments. The method 900 may be performed by one or more appropriate devices described herein, such as a content receiver, a content distribution server, or a user device (e.g., smart television, smart phone, tablet computer) that includes an application or programming specifically configured to perform the operations described herein. The method 900 is a computer-implemented method performed by one or more processors of the appropriate device(s) as a result of execution of a set of computer-executable instructions stored in memory.

The method 900 includes receiving 902 a request to modify defined audio events in video content to be displayed on a display device. The request received in 902 may be provided by a viewer as a result of navigating and interacting with the menu discussed with respect to FIG. 2. Receiving the request may include receiving modification setting information specifying a set of defined audio event types to be filtered from the video content, and which may include information specifying modification operations to be performed on the defined audio events detected. The modification setting information received in 902 may be stored in memory for future reference in determining defined audio events to be filtered or modified. In some embodiments, the request may be received in 902 as part of or in connection with a request by a viewer to view particular video content, such as an episode of a show or a movie.

The method 900 continues by obtaining 904 video content to be provided for presentation on a display device. The video content obtained in 904 may include visual content, such as a collection of images to be displayed sequentially, and audio content that is to be played in connection with display of the visual content. The video content may be obtained in 904 from a remote content distribution server by a content receiver in response to a request sent by the content receiver to the remote content distribution server over a network. The video content may be obtained in 904 from data storage by a content distribution server and then sent to a content receiver for display.

The method 900 includes identifying 906 an occurrence of one or more defined audio events that corresponds to audio event types specified in the request received in 902. Identifying 906 the occurrence of the defined audio event may include identifying a first defined audio event of a first audio event type (e.g., doorbell event type) and identifying a second defined audio event of a second audio event type (e.g., animal noise event type). Identifying 906 the occurrence of defined audio event may include identifying a time period (e.g., start time and stop time) in the video content that corresponds to the defined audio event type or identifying image content in the visual content that corresponds to the first audio event type (e.g., range of image frames in the visual content). The occurrence of the defined audio event may be identified as a result of comparing event information associated with the video content with the modification setting information and determining a match between an audio event type of an audio event in the event information and an audio event type specified in the modification setting information. In some embodiments, the one or more processors may provide the video content or the audio content thereof to a machine learning model, which is trained to provide an output indicating the occurrence, if any, of defined audio events in the video content.

The method 900 includes modifying 908 the occurrences of defined audio events detected in the video content according to one or more modification operations to generate modified audio content of the video content. In some embodiments, the occurrences of the defined audio events detected may be modified in 908 based on modification setting information specifying modification preferences of a viewer. In some embodiments, modifying 908 may be based on predetermined modification settings that specify particular modifications to be performed for each defined audio event type. For instance, the predetermined modification settings may specify that a first modification operation (e.g., active noise cancellation) is to be performed on defined audio events of a first type (e.g., doorbell event types) and that a second modification operation (e.g., frequency filtration) is to be performed on defined audio events of a second type (e.g., infant crying event types).

Modifying 908 the occurrences of the defined audio events corresponding to audio event types specified to be filtered may include performing the process 600 for active noise cancellation of defined audio event types, performing the process 700 for filtering or attenuating occurrences of defined audio event types, and/or performing the process 800 for replacement of occurrences of defined audio event types. The one or more processes performed in 908 may be determined based on the modification setting information described herein.

The one or more processors may obtain or generate modified audio content as a result of modifying 908 the occurrences of the defined audio events. For example, the one or more processors may obtain audio content resulting from combining or mixing the time-domain signal 622 with the segment 608 to obtain the modified audio content 624, as described with respect to FIG. 6. As another example, the one or more processors may obtain audio content resulting from applying one or more filters to the segment 708 to obtain a filtered frequency content of the segment 708, as described with respect to FIG. 7. As yet a further example, the one or more processors may obtain second audio content to replace the defined audio events and may adjust characteristics of the second audio content to match or be more similar to the original audio content, as described with respect to FIG. 8.

At 910, the method 900 includes associating 910 the modified audio content with the visual content in the video content that corresponds to the defined audio events identified or detected in 906. Associating 910 the modified audio content with the corresponding visual content may include modifying metadata of the video content to specify that the modified audio content should be played at a particular playback time or time range in the video content that corresponds to the time at which the defined audio event occurred in the video content. In some embodiments, the metadata may be modified to specify that the modified audio content should be played beginning at a particular image frame or during a particular range of image frames. The metadata may include a flag or other designation indicating that the video content includes an occurrence of a defined audio event type. Associating 910 the modified audio content with the corresponding visual content may include replacing a segment of the original audio content with the modified audio content. Associating 910 the modified audio content with the corresponding visual content may include determining a visual indicator to be included with the visual content regarding the defined audio event detected in the audio content, as described with respect to the visual indicator 316 of FIG. 3. The visual indicator is associated with a particular time range or set of image frames in the visual content that correspond to times or image frames at which the defined audio event was detected.

The method 900 continues by providing 912 the modified audio content in association with the video content. Providing 912 the modified audio content may include outputting the modified audio content directly from a device as an electrical audio signal. For example, the one or more processors of a content receiver may output, from a High Definition Media Interface port, a transition-minimized differential signal that includes audio data corresponding to the modified audio content and the video content. Providing 912 the modified audio content may include streaming, by a content distribution server, the video data over one or more networks to a content receiver to fulfill a request by the content receiver to provide the video content. In some embodiments, the content distribution server may stream the video data to a user device, such as a smartphone, smart television, or tablet computer. The video data for a defined audio event type to be filtered or modified may include the modified audio content instead of the original audio content including the defined audio event.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method, comprising:
    receiving a request to modify audio events in video corresponding to a non-speech audio event type;
    obtaining first video content to be provided for presentation on a display device, the video content including visual content and audio content;
    identifying, using a machine learning model, an occurrence of a first defined audio event of the non-speech audio event type in the audio content, wherein the machine learning model is trained on a collection of training video content including both (a) visual content corresponding to one or more audio events of the non-speech audio event type and (b) audio content corresponding to the one or more audio events of the non-speech audio event type;
    modifying audio content of the first defined audio event according to a first modification operation to generate first modified audio content of the first defined audio event, by at least:
        determining one or more dominant frequencies from the audio content of the first defined audio event;
        excluding one or more frequency ranges from the determining of the one or more dominant frequencies; and
        phase shifting frequency content of the determined one or more dominant frequencies without phase shifting frequency content within the excluded one or more frequency ranges;
    associating the first modified audio content with a first segment of the visual content that corresponds to the first defined audio event; and
    providing the first modified audio content in association with the first segment for presentation on the display device.

2. The computer-implemented method of claim 1, wherein identifying the occurrence of the defined first audio event includes identifying a time period in the video content that corresponds to the non-speech audio event type.

3. The computer-implemented method of claim 1, wherein identifying the occurrence of the defined first audio event includes identifying image content in the visual content that corresponds to the non-speech audio event type.

4. The computer-implemented method of claim 1, comprising:
    generating an opposing audio event having a waveform with amplitudes aligned with and opposing amplitudes of the first defined audio event, wherein performing the first modification operation includes combining the opposing audio event with the first defined audio event.

5. The computer-implemented method of claim 1, comprising:
    detecting frequency characteristics of the first defined audio event;
    determining a first filter to be applied to the first defined audio event based on frequency characteristics detected; and
    applying the first filter to the first defined audio event, wherein the modified audio content is generated based on output of the first filter.

6. The computer-implemented method of claim 1, comprising:
    receiving, by a server, an indication by a viewer of the occurrence of the first defined audio event in the video content, wherein the occurrence is identified as a result of receiving the indication.

7. The computer-implemented method of claim 1, comprising:
    determining the first modification operation to be performed based on modification setting information provided by a viewer.

8. The computer-implemented method of claim 1, comprising:
    receiving a request to modify audio events corresponding to an other audio event type different than the non-speech audio event type;
    identifying an occurrence of a second defined audio event of the other audio event type in the audio content;
    modifying the second defined audio event to generate second modified audio content of the second defined audio event;
    associating the second modified audio content with a second segment of the visual content; and
    providing the second modified audio content in association with the second segment for presentation on the display device.

9. The computer-implemented method of claim 8, wherein the second defined audio event is modified according to a second modification operation different than the first modification operation.

10. The computer-implemented method of claim 1, wherein the non-speech audio event type is an event type selected from an infant crying event type, a doorbell event type, an animal noise event type, a knocking event type, and a gunshot event type.

11. The computer-implemented method of claim 1, wherein excluding one or more frequency ranges from the determining of the one or more dominant frequencies comprises:
    excluding a frequency range that corresponds to adult human voices, prior to the determining of the one or more dominant frequencies.

12. A system, comprising:
one or more processors; and
memory storing instructions that, as a result of execution by the one or more processors, cause the system to:
obtain modification setting information associated with a viewer specifying a non-speech audio event type to be modified in video content;
obtain first video content to be provided for presentation on a display device, the first video content including visual content and audio content;
identify, using a machine learning model, an occurrence of a first defined audio event of the non-speech audio event type in the audio content, wherein the machine learning model is trained on a collection of training video content including both (a) visual content corresponding to one or more audio events of the non-speech audio event type and (b) audio content corresponding to the one or more audio events of the non-speech audio event type;
modify audio content of the first defined audio event according to a first modification operation to generate first modified audio content of the first defined audio event, by at least:
determining one or more dominant frequencies from the audio content of the first defined audio event;
excluding one or more frequency ranges from the determining of the one or more dominant frequencies; and
phase shifting frequency content of the determined one or more dominant frequencies without phase shifting frequency content within the excluded one or more frequency ranges;
associate the first modified audio content with a first segment of the visual content that corresponds to the first defined audio event; and
provide the first modified audio content in association with the first segment for presentation on the display device.

13. The system of claim 12, wherein execution of the instructions causes the system to:
determine a frequency content of the first defined audio event by at least performing a frequency domain transform on the occurrence of the first defined audio event;
shift a phase of the frequency content to generate modified frequency content of the first defined audio event; and
perform a time domain transform on the modified frequency content to obtain a time domain signal of the modified frequency content.

14. The system of claim 12, wherein execution of the instructions causes the system to:
determine frequency content of the first defined audio event by at least performing a frequency domain transform on the occurrence of the first defined audio event;
perform the first modification operation on the frequency content based on modification setting information to generate the modified audio content.

15. The system of claim 12, wherein execution of the instructions causes the system to:
obtain, in response to identifying the occurrence, second audio content previously selected for replacement of occurrences of the non-speech audio event type, wherein the first modification operation includes replacement of the first defined audio event with the second audio content.

16. The system of claim 12, wherein execution of the instructions causes the system to:
receive, over a network from a remotely located content receiver, a request to provide the video content; and
transmit, over the network to the remotely located content receiver, the first modified audio content in association with the first segment.

17. The system of claim 12, wherein execution of the instructions causes the system to:
provide the first video content as input to the machine learning model; and
receive output from the machine learning model indicating the occurrence of the non-speech audio event type in the first video content.

18. One or more non-transitory computer-readable media storing instructions that, as a result of execution by one or more processors, cause the one or more processors to: obtain modification setting information associated with a viewer specifying a non-speech audio event type to be modified in video content; obtain video content to be provided for presentation on a display device, the video content including visual content and audio content; identify, using a machine learning model, an occurrence of a defined audio event of the non-speech audio event type in the audio content, wherein the machine learning model is trained on a collection of training video content including both (a) visual content corresponding to one or more audio events of the non-speech audio event type and (b) audio content corresponding to the one or more audio events of the non-speech audio event type; modify audio content of the defined audio event according to a modification operation to generate modified audio content of the defined audio event, by at least: determining one or more dominant frequencies from the audio content of the defined audio event; excluding one or more frequency ranges from the determining of the one or more dominant frequencies; and phase shifting frequency content of the determined one or more dominant frequencies without phase shifting frequency content within the excluded one or more frequency ranges; associate the modified audio content with a segment of the visual content that corresponds to the defined audio event; and provide the modified audio content in association with the segment for presentation on the display device.

19. The one or more non-transitory computer-readable media of claim 18, wherein the instructions cause the one or more processors to:
compare the modification setting information with event information associated with the video content, the event information specifying a set of defined audio events and audio event types for each of the set of defined audio events, wherein the occurrence of the defined audio event is identified based on determining a match between the audio event type specified in the modification setting information and the event information.

20. The one or more non-transitory computer-readable media of claim 18, wherein the instructions cause the one or more processors to:
determine a visual indicator that corresponds to the non-speech audio event type;
associate the visual indicator with the segment of the visual content; and
provide the visual indicator in association with the segment for display on the display device.

21. The one or more non-transitory computer-readable media of claim 18, wherein the instructions cause the one or more processors to:

attenuate conspicuity of the occurrence of the defined audio event in a segment of the audio content and maintain conspicuity of other audio in the audio content.

* * * * *